United States Patent
Dornseiffer et al.

(10) Patent No.: US 6,613,293 B2
(45) Date of Patent: *Sep. 2, 2003

(54) ELECTRICALLY HEATED CATALYTIC CONVERTER

(75) Inventors: Jürgen Dornseiffer, Aachen (DE); Helmut Hackfort, Köln (DE)

(73) Assignee: Forschungszentrum Jülich GmbH, Jülich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,569

(22) Filed: Oct. 29, 1999

(65) Prior Publication Data

US 2003/0113240 A1 Jun. 19, 2003

Related U.S. Application Data

(63) Continuation-in-part of application No. PCT/DE98/01173, filed on Apr. 25, 1998.

(30) Foreign Application Priority Data

Apr. 30, 1997 (DE) .......................................... 197 18 239

(51) Int. Cl.$^7$ .............................. F01N 3/10; F01N 3/18; F01N 3/035; B01D 53/86; B01J 35/04
(52) U.S. Cl. ...................... 422/174; 422/177; 422/180; 60/274
(58) Field of Search ............................... 422/174, 177, 422/180; 219/552; 60/299, 300, 273–274

(56) References Cited

U.S. PATENT DOCUMENTS

| 5,177,961 A | * | 1/1993 | Whittenberger | 422/174 |
| 5,182,086 A | * | 1/1993 | Henderson et al. | 422/174 |
| 5,403,559 A | * | 4/1995 | Swars | 422/180 |
| 5,569,455 A | * | 10/1996 | Fukui et al. | 422/174 |

* cited by examiner

Primary Examiner—Hien Tran
(74) Attorney, Agent, or Firm—Klaus J. Bach

(57) ABSTRACT

In an electrically heated catalytic converter including a heater consisting of a structure having an open porosity so as to permit fluid to flow therethrough, a heterogeneous catalyst is disposed within the heater structure. The heater structure, which includes the catalyst, is capable of accommodating sufficient electrical energy to provide the activation energy required for a particular catalytic reaction to be performed by the catalytic converter.

4 Claims, 1 Drawing Sheet

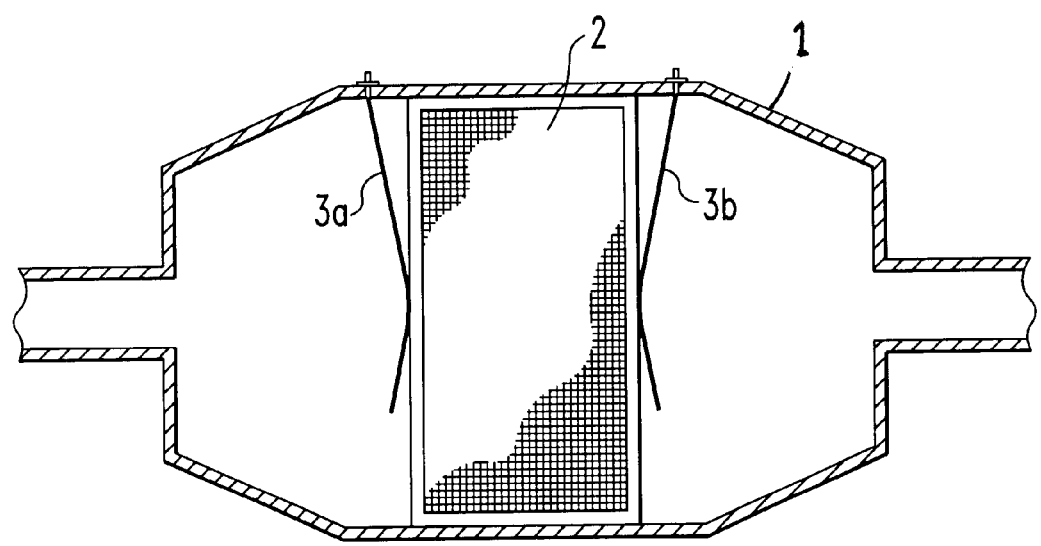

ELECTRICALLY HEATED CATALYTIC CONVERTER

This is a continuation-in-part application of pending international application PCT/DE98/01173 filed Apr. 25, 1998 and claiming the priority of German application 197 18 239.9 filed Apr. 30, 1997.

BACKGROUND OF THE INVENTION

The invention relates to an apparatus including a catalytic converter with electric heating means for activating the catalyst of the catalytic converter.

Catalysts accelerate chemical reactions or control chemical reactions so that they occur in certain ways (selectivity). The chemical efficiency and also the conversion process for generating a certain desirable product is increased. Basically, a catalyst only affects the kinematics of a particular reaction. The thermodynamic conditions are not changed.

A distinction is made between homogeneous and heterogeneous catalysts. In the last mentioned type, catalysts and reactions are in different phases. These catalysts which are often called "contacts" are used mainly for the acceleration of gas phase reactions such as oxidation hydration or steam reformation.

With heterogeneous catalysts, the reactants are adsorbed on the surface of the catalyst where they are converted to species, which are capable of reacting. The reaction occurs by way of diffusion effects and the products are then desorbed.

Independent from the reaction system under consideration energy is required for the conversion of the reactants to species capable of reacting. This kind of energy will be called below the activation energy of the catalyst. For endothermic reactions (for example, steam reformation) the activation energy must be supplied permanently from the outside already for thermodynamic reasons. In exothermic processes (for example, catalytic oxidation), the energy needs to be supplied from the outside only to get the reaction started. Subsequently, the energy released during the reaction covers the activation energy of the catalyst.

For an effective acceleration of a reaction, a catalyst with sufficient conversion capability (activity) as well as a minimum amount of energy must be available.

In industrial applications of catalysts, sufficient energy is available from optimized reactor- and burner systems or by preheating of the reactants. For small-scale applications, those solutions however are too expensive.

An example of a small-scale application is an exhaust gas catalytic converter of a gasoline engine. In this case, the exhaust gases generally provide sufficient energy for a rapid elimination of pollutants. However, during cold startup or idling operations, three-way converters of automobiles do not operate very well, since under these circumstances, the exhaust gas does not supply sufficient thermal energy.

DE 41 10 395 A1 discloses an arrangement for solving this problem. It includes an electric heater with honeycomb-like channels, which extend in parallel. A start-up catalyst is disposed in the honeycomb-like channels in the form of layers. The catalytic converter can be heated by a heater as disclosed in the printed publication DE 41 10 395 A1. The heating energy required by the start-up catalyst can be rapidly supplied.

It is the object of the present invention to provide an arrangement including a heterogeneous catalyst which is suitable for small-scale use and which has an improved efficiency.

SUMMARY OF THE INVENTION

In an electrically heated catalytic converter including a heater consisting of a structure having an open porosity so as to permit fluid to flow therethrough, a heterogeneous catalyst is disposed within the heater structure. The heater structure, which includes the catalyst, is capable of accommodating sufficient electrical energy to provide the activation energy required for a particular catalytic reaction to be performed by the catalytic converter.

The pores are arranged irregularly so that gas passing through the pores is repeatedly deflected. The expressions "open porosity" as used herein does not cover parallel honeycomb-like channels as they are known from DE 41 10 395 A1. Furthermore, the heterogeneous catalyst is arranged in the interior of the heater body.

The required activation energy of the catalyst is supplied to the reaction by way of the electric heater. Electric energy is converted to heat energy and provided as activation energy for the catalyst. Since a direct coupling with the catalyst is provided, the energy can be applied directly at the location where it is needed for the catalytically supported reaction. The energy density can be controlled steplessly by controlling the electric power supplied to the heater so as to achieve high efficiencies. The required thermal energy is generated in situ. Energy losses occur essentially only as a result of the heat capacity of the materials involved. For this reason, also good energy efficiencies can be achieved.

The porosity of the heater material provides for a particularly large surface. The advantageous results achieved by such a large surface area will be pointed out below on the basis of exemplary embodiments.

As an electric heater, which is particularly suitable for the conversion of electric energy to heat energy, an electric semi-conductor body is used. In the semiconductor body, electric energy is converted to heat energy with high efficiency.

In a very simple embodiment of the invention, the catalyst is arranged loosely within a container-like electric heater consisting of a semi-conductor material. With this arrangement, problems of attaching the catalyst to the electric heater are avoided.

As electric heater for example, the porous flow-through heating element known from DE 41 30 630 may be provided. If this heating element is tubular, the catalyst material may be placed into the tubes as a loose fill. The current is supplied to the heating element in a way as it is known for example from DE 42 09 685. Fluid extracts are supplied to the catalyst preferably through the tube wall. In this way, not only the catalyst, but also the extracts are heated in a simple manner.

In another embodiment of the invention, the semi-conductor is identical with the catalyst material. The semi-conductive material then has a double function. The catalyst is then activated in an optimal way and there are no mounting problems. Doped materials of the group of the perovskites can be used. However, such cases are considered to be an exception as they are normally expensive.

In another embodiment of the invention, the catalytically active material is attached to a support structure, that is, to a carrier having an open porosity. In this way, the catalyst is heated directly and over a large area. In this way, the activation energy for the catalyst is supplied especially fast and economically. In addition, the catalyst then has the well-known large surface area to achieve large-scale chemical conversions. This embodiment can be realized in most cases. It finds more widespread applications than the two previous embodiments. A disadvantage is however that the catalyst material can detach from the support structure and get lost.

Upon selection of an electrical semi-conductor material for the electric heater, particular attention must be given that the material can withstand thermal stresses and is corrosion resistant in order to obtain a long operating life. Ceramic semi-conductor materials such as SiC doped with boron or nitrogen are particularly suitable. Also to be considered are transition metal carbides such as titanium carbide, tungsten carbide and nitrides such as titanium nitride.

The catalyst material is applied to the semi-conductor material by a coating or a combination method. The selection of the catalyst depends on the respective field of application for the system. Basically, the invention can be used with any known catalyst.

In another embodiment of the invention, the catalyst material is cemented to a semi-conductor material. A ceramic cement is suitable for this purpose. This kind of attachment is simple and reliable.

Particularly suitable are catalyst materials, which can be applied by a coating method onto an electrical heater since then the manufacture is particularly simple. Precious metal catalysts such as Pt or Rh as well as transition metal oxide catalysts such as $V_2O_5$, CuO, $MnO_2$, can be applied reliably by a coating procedure.

In situ heated oxidation catalysts can be operated efficiently. They can be used especially for the removal of contaminants from exhaust gases by a catalytic oxidation of the toxic contaminants with oxygen remaining in the gas.

This is true for stationary as well as mobile systems. In another embodiment of the invention, th catalyst consists therefore of materials on the basis of precious metals (for example Pt or Rh), of transition metal oxides such as CuO, $MnO_2$, $V_2O_5$ or $MoO_3$ or of a member of the perovskite group.

In another embodiment of the invention, the catalyst is arranged in an exhaust gas duct for example, the exhaust pipe of a motor vehicle.

Areas of application for the arrangement according to the invention are:

catalytic oxidation of toxic hydrocarbons such as dioxene, furane, and/or polycyclic aromatic hydrocarbons (PAH) or, respectively, of reaction gases such as CO in the exhaust gases of the respective combustion apparatus.

catalytic oxidation of carbon aerosols of the exhaust gases of internal combustion engines, (for example, Diesel carbon particle catalytic converter).

It is of course, also possible to replace a burner system in a heating apparatus by an arrangement according to the invention, wherein the thermal energy is generated by a catalytic oxidation of the fuels used (for example, natural gas). Because of the discontinuous operation of such apparatus, an appropriate thermal activation of the catalyst is needed before each heating cycle if a catalyst-equipped heating system is employed. The semiconductor carrier material furthermore increases the energy efficiency since it acts as an intermediate storage for the energy generated and releases that energy to its environment in a controlled manner.

Below, an embodiment of the invention will be described on the basis of the accompanying drawings.

BRIEF DESCRIPTION OF THE DRAWING

The sole figure shows schematically a catalytic converter according to the invention.

DESCRIPTION OF A PARTICULAR EMBODIMENT

In a housing 1, a porous SiC body 2 doped with boron or nitrogen is coated by an oxidation catalyst on the basis of precious metals (for example Pt, Rh) or transition metal oxides (for example, $V_2O_2$, $MoO_3$). For this purpose, a ceramic cement in the form of $Al_2O_3$ is first applied to the SiC surface. The coating is performed by way of a dipping procedure with an organic or aqueous Al-containing solution and subsequent drying.

For the manufacture of a resistant compound structure, the ceramic body is sintered at temperatures of 400 to 900° C. In this process, an aluminosilicate is formed from the $SiO_2$ and the $Al_2O_3$ on the SiC surfaces, which provides for the required adherence. Finally, the $Al_2O_3$ is impregnated with the catalytically active component (for example Pt, $V_2O_5$) also by a dipping procedure with organic or aqueous solutions and subsequent sintering at 400° C. to 100° C. Depending on the catalyst material, solutions of $H_2(PtCl_6)$, $RhCl_3$, $(NH_4)VO_3$ or $AlCl_3$ are preferred.

For the selection of a solution, care should be taken that the difference of the surface tensions between the solution and the ceramic semi-conductor material is as small as possible in order to achieve uniform coating coverage. Organic solutions such as hexane, alcohol, and acetone are therefore preferable to aqueous solutions.

Electrical contacts are, provided by resiliently pressing electrical conductors 3a, 3b onto the semiconductor material body or porous SiC body 2 for supplying electrical energy to the body of semiconductor material.

The compound heater structure so manufactured may be installed for example into the exhaust duct of a motor vehicle.

What is claimed is:

1. A method of operating a catalytic converter including a heterogeneous catalyst, comprising the steps of: providing as a heater an electric semiconductor body consisting of SiC doped with boron or nitrogen and having a structure with irregularly arranged pores forming passages in which said heterogeneous catalyst is disposed in said semiconductor body, and in which gas passing through said passages is repeatedly deflected while being exposed to said catalyst for catalyzing a chemical reaction, and supplying an electrical activation energy as required to catalyze said chemical reaction to said electric semiconductor body such that said gas is catalyzed and heated at the same location while only a catalytic reaction, but no combustion takes place.

2. A method according to claim 1, wherein said catalytic converter is located in an exhaust gas duct of an exhaust system for catalyzing exhaust gas passing through said exhaust gas duct.

3. A method according to claim 2, wherein said exhaust system is the exhaust system of a motor vehicle.

4. A method according to claim 3, wherein contaminants are removed from said exhaust gas by a catalytic oxidation reaction.

* * * * *